US006607841B2

(12) United States Patent
Chow

(10) Patent No.: US 6,607,841 B2
(45) Date of Patent: Aug. 19, 2003

(54) SILICON STEEL SHEET

(76) Inventor: Albert Chow, 2F, No. 2, Lane 37, Ming-Yuan St., Sanchung City, Taipei Hsien (TW)

(*) Notice: Subject to any disclaimer, the term of this patent is extended or adjusted under 35 U.S.C. 154(b) by 95 days.

(21) Appl. No.: 09/977,345

(22) Filed: Oct. 16, 2001

(65) Prior Publication Data

US 2003/0070735 A1 Apr. 17, 2003

(51) Int. Cl.[7] .......................... B32B 3/06; B32B 15/18; B21C 47/02; B21C 47/32; B21H 3/12

(52) U.S. Cl. ...................... 428/592; 428/573; 428/583; 428/584; 428/594; 148/527; 72/127; 72/129; 72/146; 72/371

(58) Field of Search ................................ 428/592, 573, 428/583, 584, 594; 72/127, 129, 146, 371; 148/527

(56) References Cited

U.S. PATENT DOCUMENTS 2,094,454 A * 9/1937 Keville ........................ 206/59
2,191,028 A * 2/1940 Miller et al. ............. 242/160.1
2,776,094 A * 1/1957 Edwards et al. ............ 242/527
3,698,223 A * 10/1972 Sagara ........................ 72/146
4,170,691 A * 10/1979 Rogers ..................... 242/56 R
4,445,646 A * 5/1984 Karr et al. .................. 242/521
4,662,954 A * 5/1987 Fedoris ....................... 148/112
5,026,439 A * 6/1991 Tanaka et al. .............. 148/111
5,319,833 A * 6/1994 Kohl et al. ................. 29/33 S
5,553,640 A * 9/1996 Ferenczy et al. ........... 138/154
5,566,443 A * 10/1996 Allan et al. .................... 29/605
6,039,283 A * 3/2000 Munoz-Baca et al. ...... 242/534
6,498,554 B2 * 12/2002 Chow ......................... 336/199

* cited by examiner

*Primary Examiner*—John J. Zimmerman
*Assistant Examiner*—Jason L Savage
(74) *Attorney, Agent, or Firm*—Birch, Stewart, Kolasch & Birch, LLP

(57) ABSTRACT

An improved silicon steel sheet has two lateral ends each having a side edge narrower than the width of the silicon sheet. The side edge has two end points linking respectively to two lateral sides of the silicon steel sheet to form two symmetrical slant edges for reducing tension area of the silicon steel sheet at the side edge. The slant edges and the side edges form two solder zones to anchor the silicon steel sheet for soldering at the initial winding stage and after the winding is completed.

3 Claims, 5 Drawing Sheets

SILICON STEEL SHEET

FIELD OF THE INVENTION

The present invention relates to an improved silicon steel sheet and particularly a silicon steel sheet with a changed soldering structure to facilitate production of silicon steel cores to reduce costs and increase production yield.

BACKGROUND OF THE INVENTION

Most presently known current limiters or choke coils have a silicon steel core formed in an annular shape (as shown in FIGS. 1A and 1B). Th silicon steel core is made of an elongated silicon steel sheet cut to a selected length from a silicon sheet 10. The formed silicon steel sheet has two lateral ends 10*a* and 10*b*. Then anchor one lateral end 10*b* to wind the silicon steel sheet in an annular shape by means of a tool to form the silicon steel core desired, and solder another lateral end 10*a* at a solder spot 10*c*. The silicon steel core thus made usually has two corners 10*d* at the lateral end 10*a* that are prone to turn upwards. The turned corners tend to hamper installation of the silicon steel core into the casing and make assembly more difficult. Moreover, the corners 10*d* tend to become very sharp after being cut. Workers who do assembly or installation of the silicon steel cores in the casings could easily get hurt or injured. While fully soldering the lateral end 10*a* and corners 10*d* can eliminate the turning up problem of the corners 10*d*, it causes additional problems in soldering operation and results in higher costs.

There are many techniques disclosed in the prior art to address the product winding processes. References can be found in U.S. Pat. Nos. 5,813,616, 2,094,454, 2,191,028, 2,776,094, 3,583,558 and 4,445,646. They generally propose to cut the end of the winding articles to a triangular shape to facilitate winding operations. Those techniques mostly aim to winding soft materials such as photo films, plastic rolls, paper, etc. The technique for winding stiff material such as silicon steel sheet is still unknown.

SUMMARY OF THE INVENTION

The primary object of the invention is to resolve aforesaid disadvantages. The invention provides a novel silicon soldering structure to allow the cut lateral ends fastening to the silicon steel sheet securely.

Another object of the invention is to provide an annular silicon steel core structure that is easier to make to reduce costs and increase production yield.

A further object of the invention is to protect workers from injury during producing and assembling the silicon steel cores.

To achieve the foregoing objects, the silicon steel sheet of the invention has two lateral ends after being punched. Each lateral end has a side edge which is narrower than the original width of the silicon steel sheet. Between the side edge and the lateral sides of the silicon steel sheet, two slant solder zones are formed for soldering use at the initial winding stage and the final winding stage.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1B:
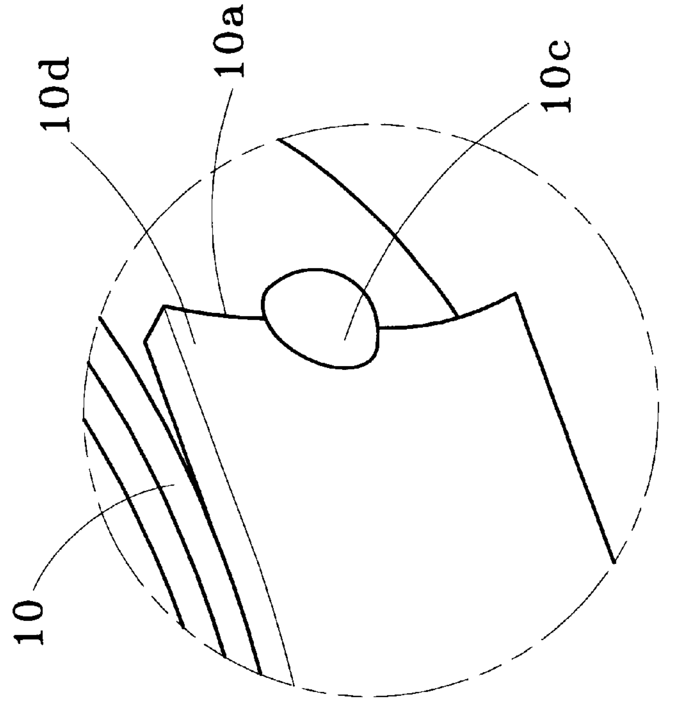
Fig.1B PRIOR ART
FIG. 1B is a fragmentary enlarged view of FIG. 1A.
Figure 1A:
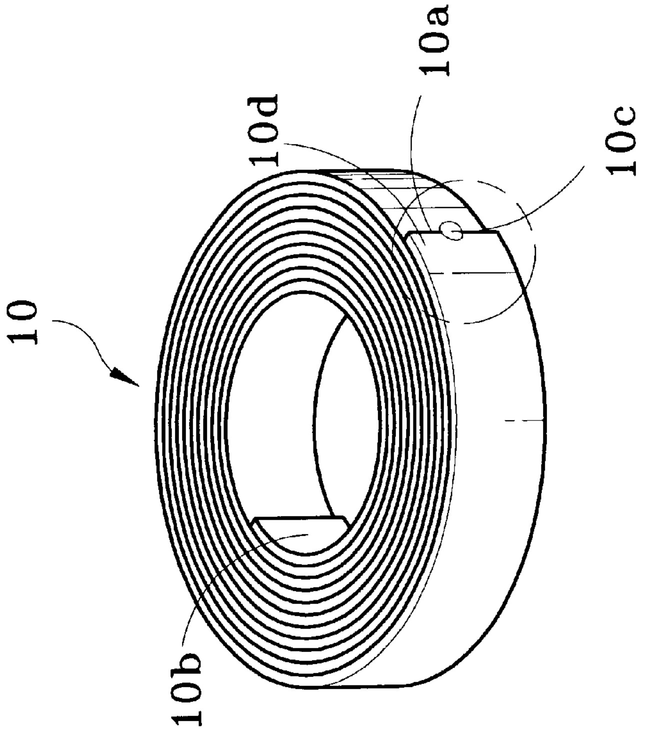
Fig.1A PRIOR ART
FIG. 1A is a perspective view of a conventional silicon steel sheet.
Figure 2:
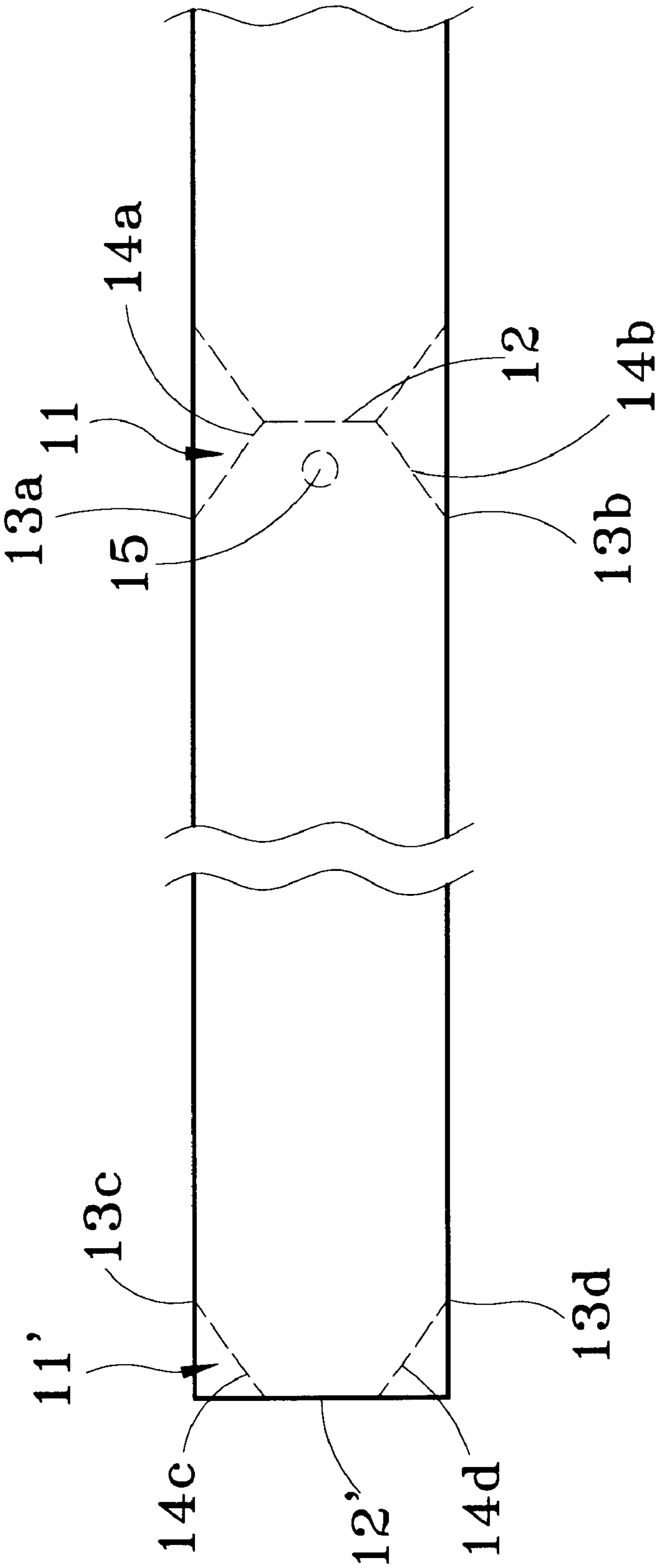
FIG. 2 is a fragmentary schematic view of a silicon steel sheet of the invention, before winding.

Referring to FIG. 2 for a fragmentary schematic view of a silicon steel sheet of the invention before winding, the invention mainly provides an improved silicon steel sheet structure that has a changed soldering structure to facilitate production of silicon steel core and to reduce costs and increase production yield.

According to the invention, a silicon steel sheet 1 is punched by a punch machine (not shown in the drawing) to form two lateral ends 11, 11'. The lateral ends 11, 11' have respectively a side edge 12, 12' which is narrower than the original width of the silicon steel sheet 1. The side edges 12, 12' have respectively two end points linking to lateral sides 13*a*, 13*b*, 13*c* and 13*d* of the silicon steel sheet 1 to form slant edges 14*a*, 14*b*, 14*c*, and 14*d* thereby to reduce the tension area of the side edges 12, 12'. The side edges 12, 12' and the slant edges 14*a*, 14*b*, 14*c*, and 14*d* form respectively solder zones 16, 17 for anchoring the silicon steel sheet 1 at the initial and final winding stage.

Figure 4:
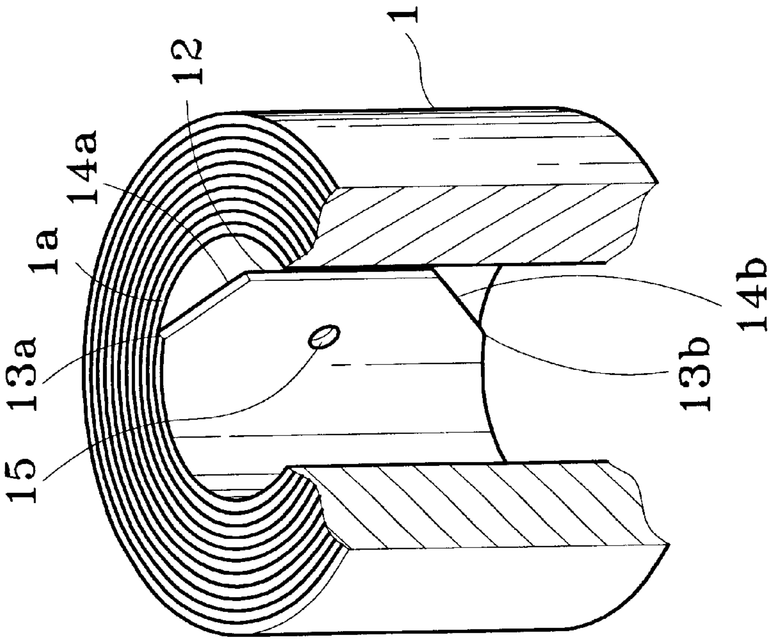
FIG. 4 is a perspective view of a silicon steel sheet of the invention, partly cut away.

Referring to FIG. 4, at either lateral end 11, there is an aperture 15 to engage with a hook for anchoring the silicon steel sheet 1 at the initial winding stage so that the subsequent winding operation of the silicon steel sheet 1 may be performed smoothly.

Figure 3:
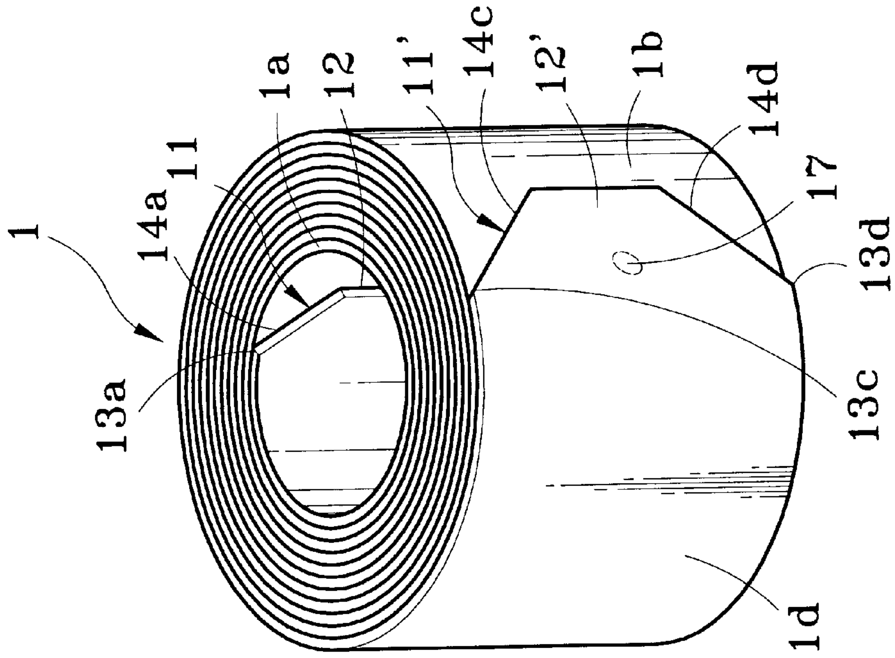
FIG. 3 is a perspective view of a silicon steel sheet of the invention, after winding.
Figure 5:
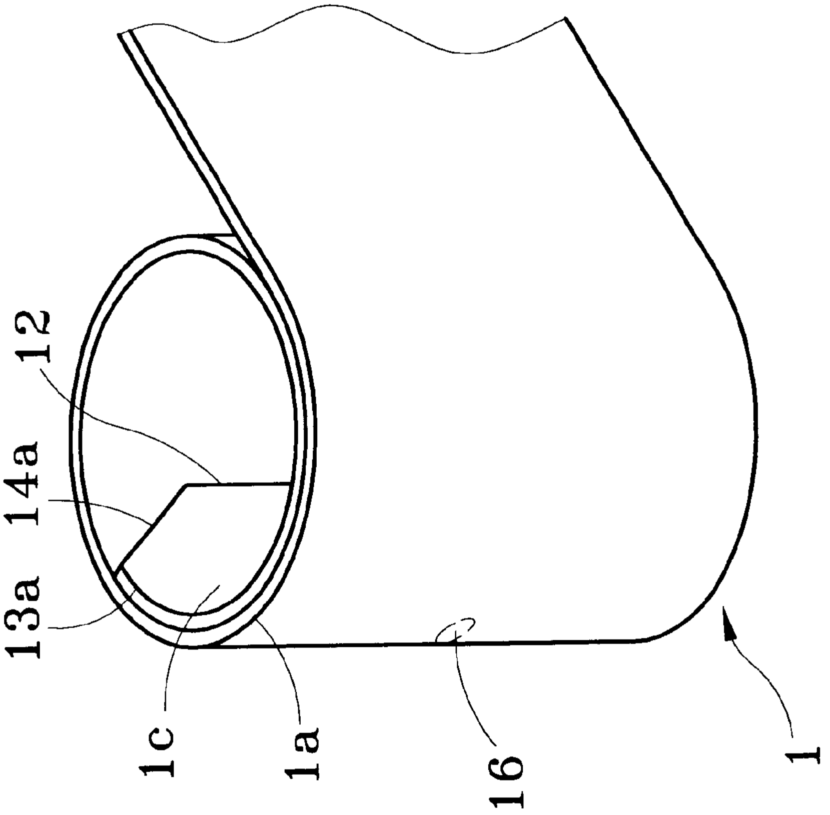
FIG. 5 is a schematic side view of a silicon steel sheet of the invention, at an initial winding stage.

Referring to FIGS. 3, 4 and 5 for the perspective and cut away views of a silicon steel sheet of the invention, for winding the silicon steel sheet 1, use a tool to engage with the aperture 15, then wind the silicon steel sheet 1 from the side edge 12 for a first section 1*c* until overlapping with another section 1*a*, then solder from exterior the first section 1*c* to the section la to form a solder zone 16, and to make the slant edges 14*a* and 14*b* anchoring on the section 1*a*. Then continuously wind the rest portion of the silicon steel sheet 1 until finished. The existing of solder zone 16 on the section 1*a* allows the silicon steel sheet 1 be wound tightly without loosening or breaking away.

When winding of the silicon steel sheet 1 is finished, the final section 1*d* of the silicon steel sheet 1 is soldered to another section 1*b* to form another solder zone 17, with the side edge 12' and slant edges 14*c* and 14*d* anchoring on the section 1*b*. As the positions of the solder zones 16 and 17 after soldered are designed through the slant edges 14*a*, 14*b*, 14*c* and 14*d*, main tension on the lateral ends 11 and 11' formed between the side edges 12, 12' and lateral sides 13*a*, 13*b*, 13*c* and 13*d* will be harnessed without turning upwards. Hence the wound and finished silicon steel core can be assembled and installed in a casing (not shown in the drawings) smoothly and easily without hampering.

Figure 6:
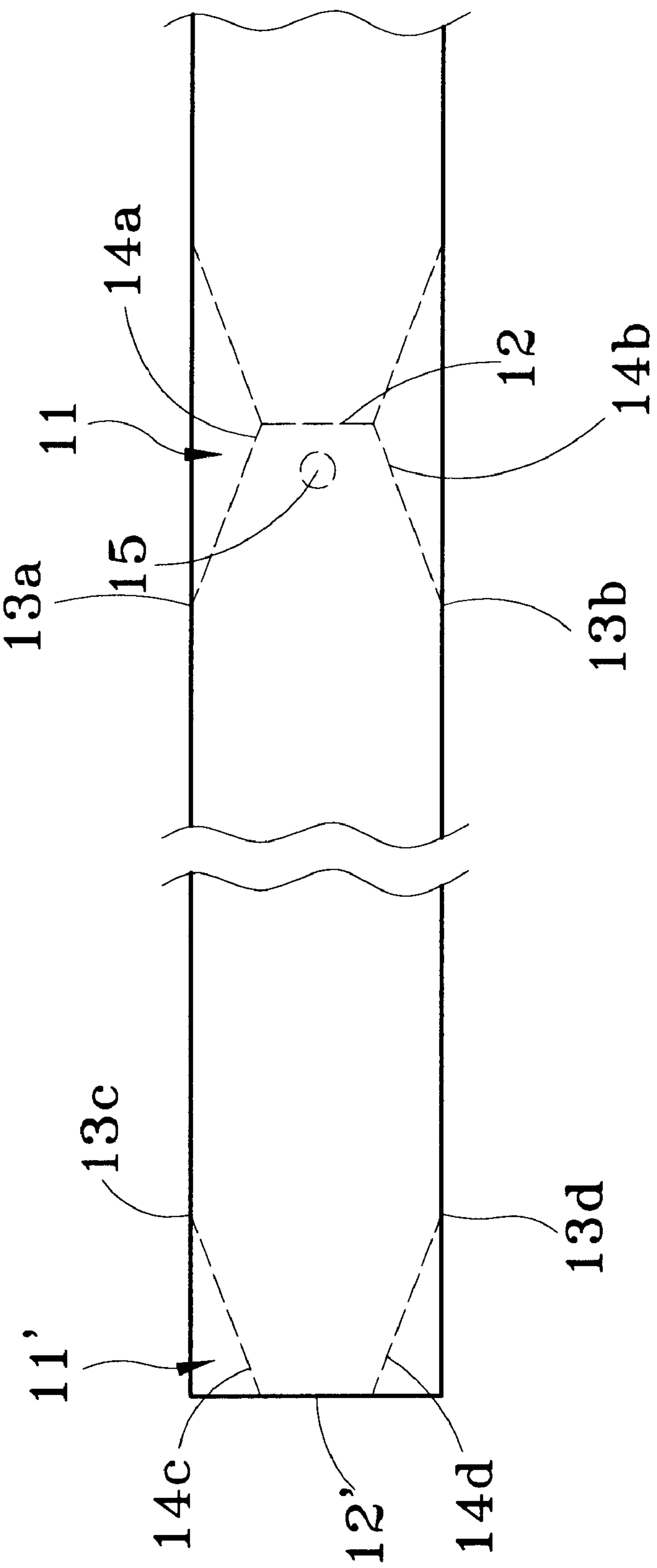
FIG. 6 is a fragmentary schematic view of a silicon steel sheet of another embodiment of the invention, before winding.

Referring to FIG. 6 for another embodiment of the invention, this embodiment is emphasized that punching forms the solder zones 16 and 17. For instance, if the side edges 12, 12' of the solder zones 16, 17 have a constant value of 10 mm and the width of the silicon steel sheet 1 is 25 mm or 50 mm, the gradients of the slant edges 14*a* and 14*b* relative to the solder zones 16 and 17 will increase and make soldering of the silicon steel sheet sections 1*c* and 1*d* to the silicon steel sheet sections 1*a* and 1*b* easier, thereby the sections 1*c* and 1*d* may be bonded to the sections 1*a* and 1*b* securely and evenly.

Besides the advantages of securely and evenly soldering the sections 1*c* and 1*d* to the sections 1*a* and 1*b* through the design of the slant edges 14*a*, 14*b*, 14*c* and 14*d* on the solder zones 16 and 17, the silicon steel sheet 1 of the invention does not have sharp corners, therefore soldering and assembly operations can be done more efficiently without hurting workers. Production costs may be reduced and production yield can be increased.

What is claimed is:

1. An improved silicon steel sheet comprising two lateral ends each having a side edge narrower than the width of the silicon sheet, the side edge having two end points linking respectively to two lateral sides of the silicon steel sheet to form two symmetrical slant edges for reducing tension areas of the side edges of the silicon steel sheet, and forming two solder zones through the side edges and the slant edges thereby to anchor the silicon steel sheet for soldering at an initial winding stage and after the winding is completed.

2. The improved silicon steel sheet of claim 1, wherein the lateral end has an aperture for anchoring the silicon steel sheet at the initial winding stage to facilitate soldering operations.

3. The improved silicon steel sheet of claim 1, wherein the width of the side edges in the solder zones is a constant value and the gradients of the slant edges increase with increasing of the width of the silicon steel sheet.

* * * * *